Jan. 22, 1952

M. P. LAURENT 2,583,512

GATE VALVE

Filed Jan. 16, 1950

INVENTOR.
Milton P. Laurent
BY
ATTORNEY

Jan. 22, 1952  M. P. LAURENT  2,583,512
GATE VALVE
Filed Jan. 16, 1950  5 Sheets-Sheet 2
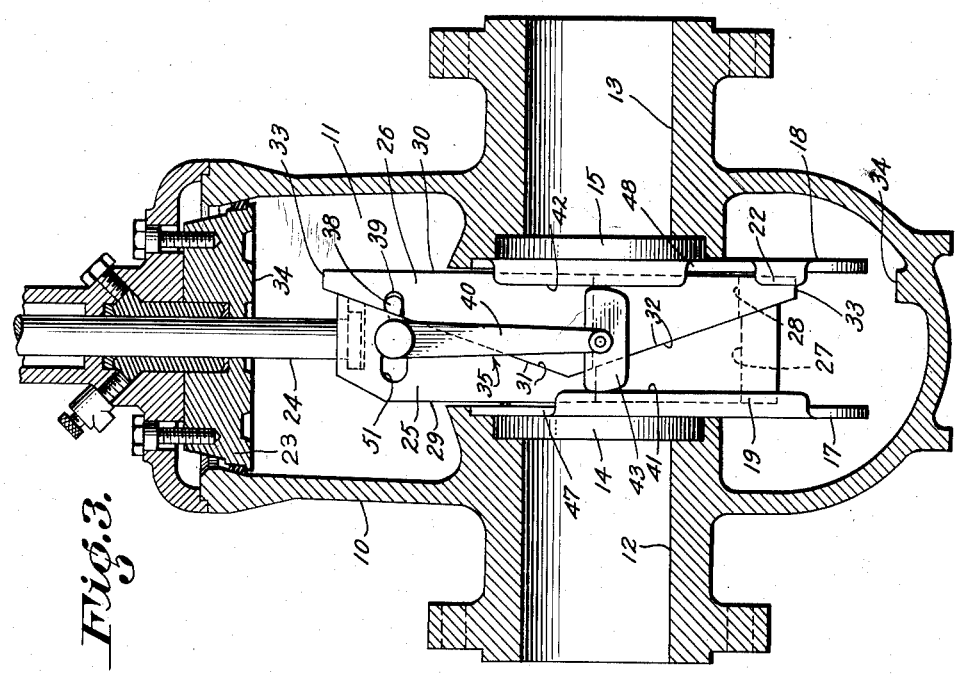
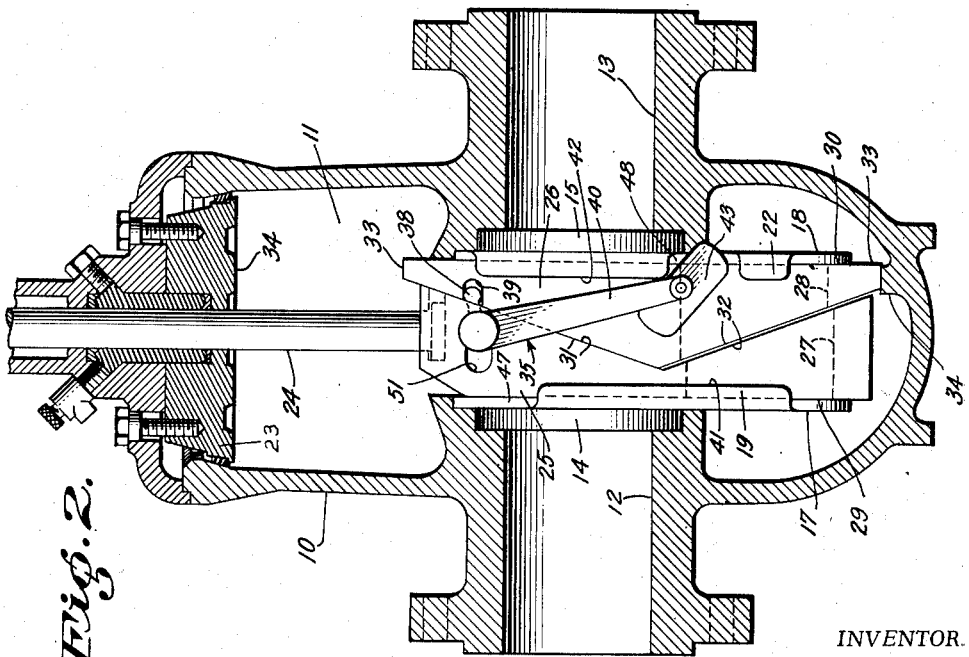
INVENTOR.
Milton P. Laurent
BY
ATTORNEY.

Jan. 22, 1952
M. P. LAURENT
2,583,512
GATE VALVE
Filed Jan. 16, 1950
5 Sheets-Sheet 3
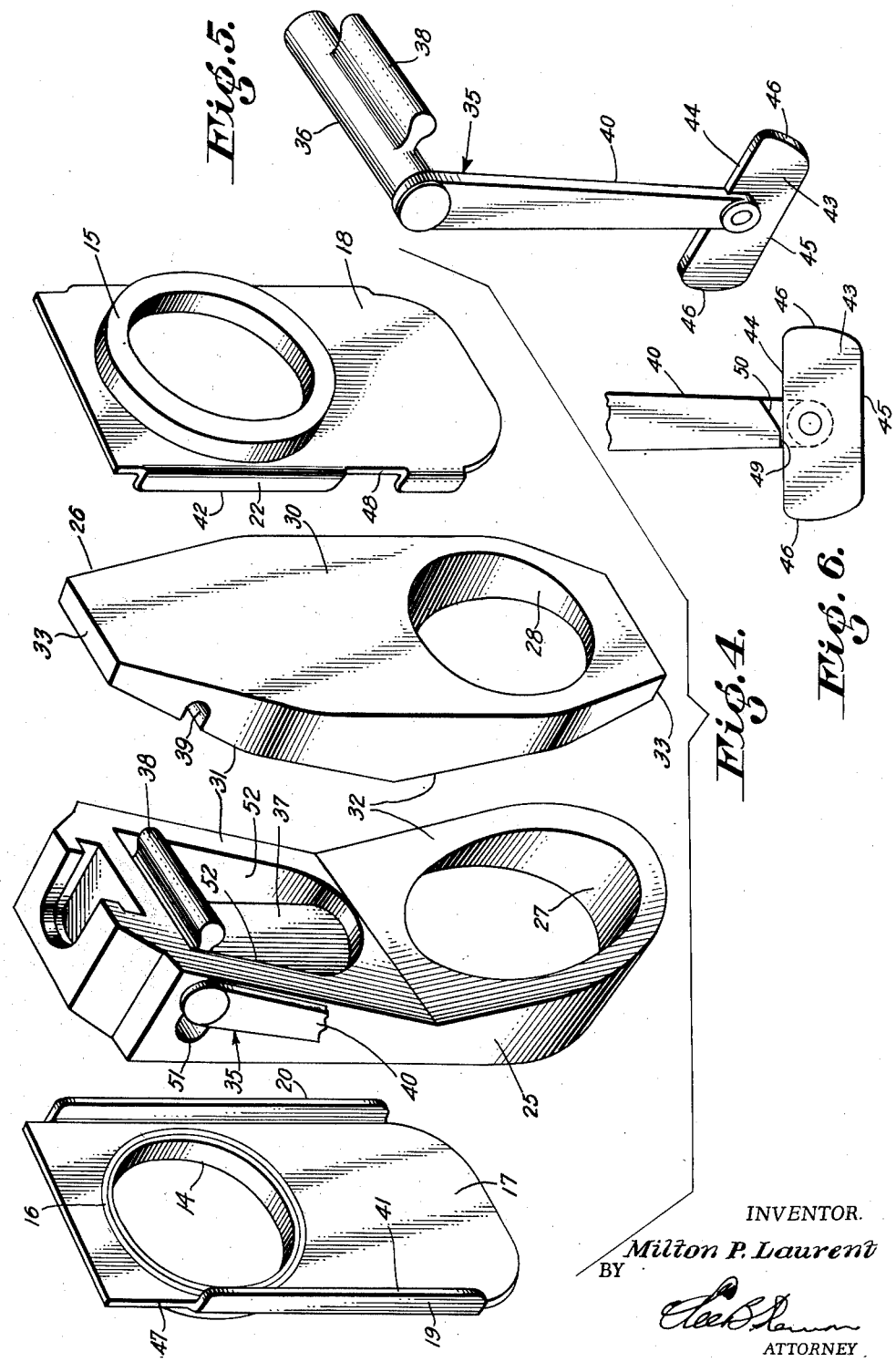
INVENTOR.
Milton P. Laurent
BY
ATTORNEY Jan. 22, 1952  M. P. LAURENT  2,583,512
GATE VALVE
Filed Jan. 16, 1950  5 Sheets-Sheet 4
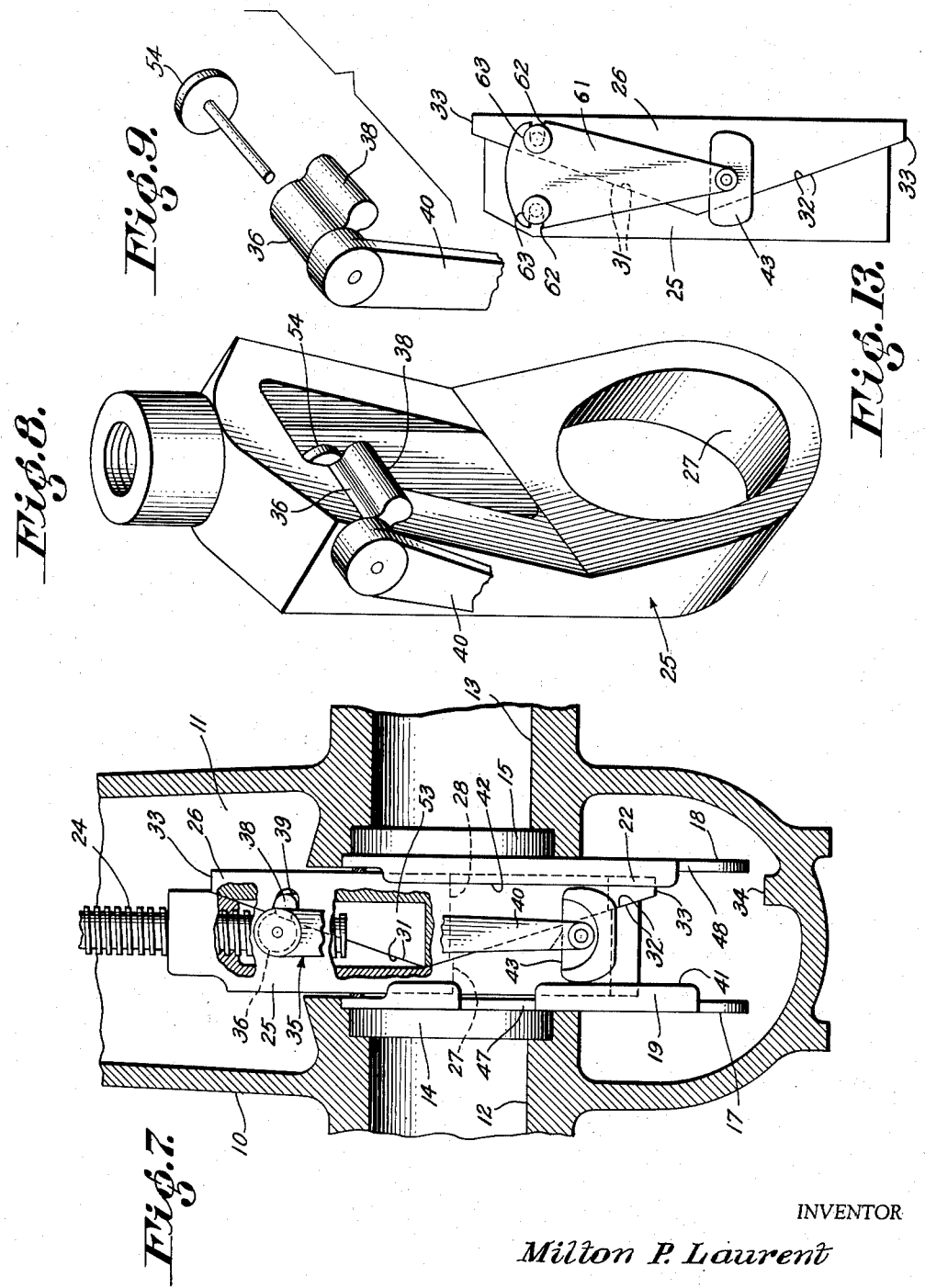
INVENTOR
Milton P. Laurent
BY
ATTORNEY

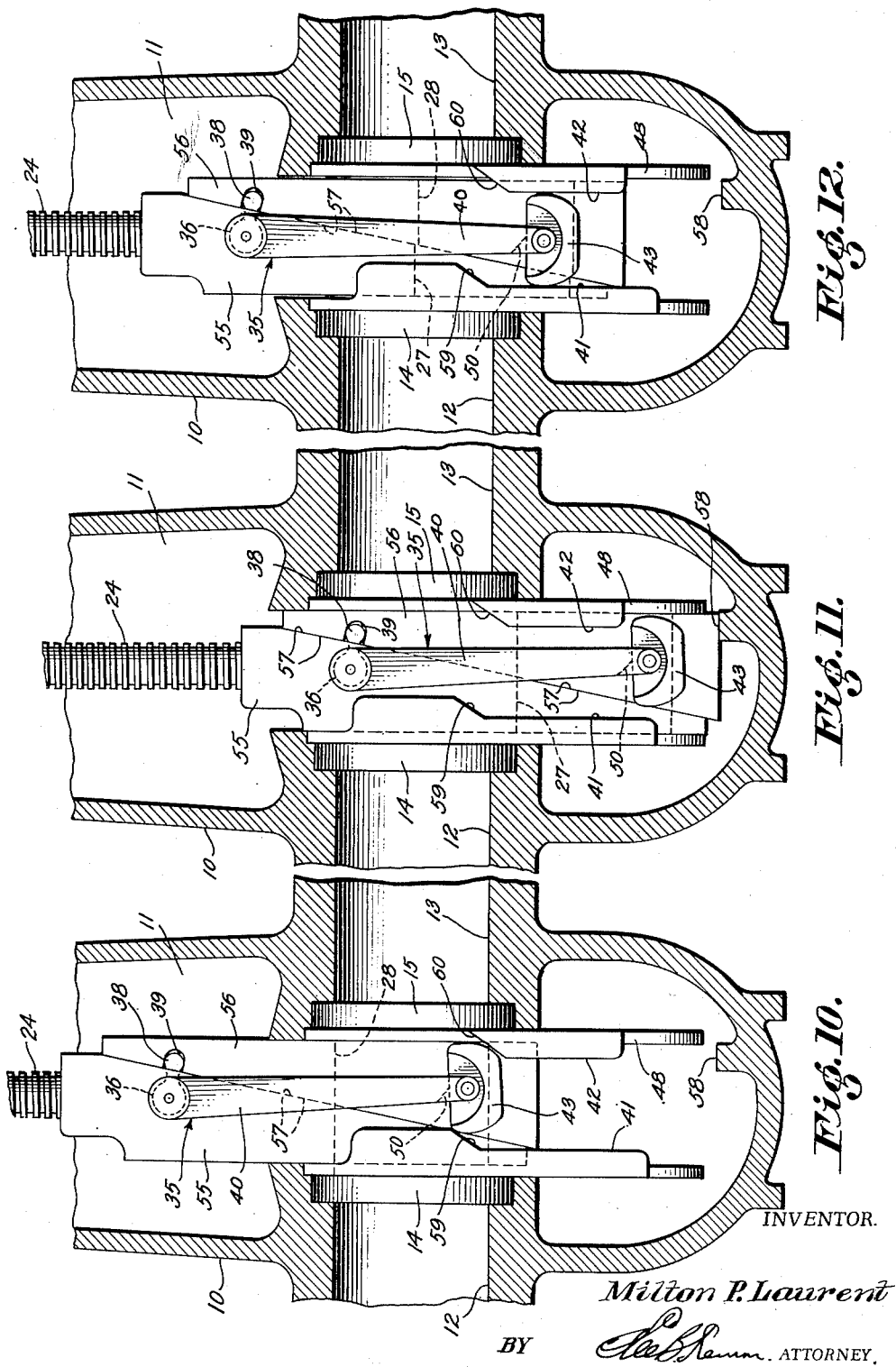

Patented Jan. 22, 1952

2,583,512

UNITED STATES PATENT OFFICE 2,583,512

GATE VALVE

Milton P. Laurent, Houston, Tex., assignor to
W-K-M Company, a joint venture

Application January 16, 1950, Serial No. 138,780

20 Claims. (Cl. 251—70)

This invention relates to improvements in "through conduit" gate valves, especially those designed to control the flow in conduits carrying fluids, such as gas or oil, which may be under high pressure. A "through conduit" gate valve is one which, when fully open, presents a uniform smooth-walled, unbroken passageway therethrough for the fluid controlled by the valve.

More particularly this improvement relates to such valves having an expansible, sectional, double-wedging valve gate assembly, such as shown in United States Patents to M. P. Laurent, Reissue No. 20,101, dated September 8, 1936 and No. 2,479,124, dated August 16, 1949. This gate assembly has two gate sections provided with complementary opposed inner faces, each formed with two angularly related surface portions that diverge transversely of the assembly, i. e., in the direction of flow through the valve, to form two sets of wedging surfaces. Either set of these wedging surfaces is effective, upon appropriate relative displacement between the two sections, from a centered relative position corresponding to the minimum overall transverse dimension of the assembly (i. e. wherein the apexes of the inner diverging faces are aligned), to expand the gate assembly normally against the valve seats. One set of wedging surfaces is employed, by causing relative displacement between the two gate sections in one direction, to expand the gate assembly as it moves into valve closing position and so provide a tight seal between the gate assembly and the valve seats, and between the two gate sections. The other set of wedging surfaces is employed, by causing relative displacement between the two gate sections in the opposite direction, to similarly tightly seal the valve, as the assembly moves into open position. The two gate sections are moved together as a unit between open and closed positions of the valve by a conventional valve stem connected to one of the sections. Stops are provided for the other, or floating, gate section at both ends of travel of the assembly, so that continued movement of the stem-connected section toward the end of travel of the assembly causes the aforesaid relative displacement between the two sections in order to seal the valve in both its open and closed positions. The many known advantages of this type of gate mechanism need not be enumerated here.

Initial operation of the valve stem, to move the gate assembly out of sealed open or sealed closed position, moves the stem-connected section while the floating section remains stationary. This initial relative displacement between the two sections, in a direction back toward their centered relative position, immediately relieves the expansive forces on the assembly created by one set of wedging surfaces, i. e. that set which sealed the assembly in the position (either open or closed) out of which it is being moved. Continued operation of the valve stem first completely centers the two sections and, if preventive means are not employed, is then apt to move the stem-connected section past centered position, relative to the floating section, substantially to the other extreme of possible relative displacement between the two sections. With the two sections in this latter relative position, the wedging surfaces of the said one set are parted and the wedging surfaces of the other set are in contact. Thereafter, continued movement of the stem-connected section produces one of two results. If the frictional forces which retard movement of the floating section are, or at any point along the travel of the assembly become high enough, sufficient additional relative displacement takes place between the two elements to cause the other set of wedging surfaces to forcibly expand the assembly against the valve seats and so bind it therebetween that further movement of the assembly toward the other end of its travel is extremely difficult, if not impossible. If the aforesaid retarding forces are not sufficiently high, the contact between the other set of wedging surfaces merely serves to drag the floating section along with the stem-connected section, and the assembly moves to the other end of its travel.

In order to prevent occurrence of the first mentioned result, means must be provided to maintain the two gate sections in substantially centered relative position, after being placed in such relative position by initial movement of the stem-connected section, during movement of the assembly from one end of its travel to the other. Known means for accomplishing this purpose are springs, such as those shown in the aforementioned United States Patents to M. P. Laurent and those shown in the United States Patent to James M. Fowler, No. 2,482,409, dated September 20, 1949. These springs, at all times, act to urge the two gate sections toward centered relative position.

Springs, however, have not proven completely satisfactory for maintaining the two gate sections in centered relative position during movement of the gate assembly between open and closed positions. In the first place, springs are not positive in their action. Hence, if the movement retarding forces acting on the floating section are sufficiently high, such as those resulting from a large positive pressure differential between the valve chamber, or the stem-connected section side of the line, and the floating section side of the line, enough relative displacement may occur between the two gate sections, before the assembly reaches the end of its travel, to cause the aforesaid other set of wedging surfaces to expand the assembly sufficiently to bind it against further movement. Secondly, since the forces exerted on such springs are considerable, particularly when the gate assembly is fully expanded, they are subject to breakage in use. Thirdly, when the gate assembly is expanded in full open or full closed position, the springs are flexed to their maximum and remain so stressed for extended periods of time, thereby shortening their useful life. Moreover, the springs frequently are exposed to metal embrittling fluids, such as the hydrogen sulphide gases present in some types of crude oil, and embrittlement takes place more rapidly at points of high stress. Fourthly, because of the effects caused by the pressure differential situation mentioned above, i. e. with the pressure in the valve chamber, or in the stem-connected section side of the line, substantially greater than that on the floating section side of the line, spring equipped valves of this type usually can handle pressure only from the floating section side of the line.

Much the same type of problems exist in a "through conduit" gate valve having an expansible sectional single-wedging valve gate assembly, such as shown in U. S. Patent No. 2,210,189 to S. Sorensen. This type of gate assembly has two gate sections provided with complementary opposed inner faces each having a single inclined surface to form one set of wedging surfaces. This one set of wedging surfaces is effective to expand the gate assembly, to seal the valve, upon relative displacement between the two sections in only one direction parallel to the movement of the assembly. Hence, means must be employed to maintain the two sections in unwedged relative position during movement of the gate assembly in one direction. The Sorensen patent also discloses the use of springs for this purpose.

Accordingly, it is an object of this invention to provide, in valves of the type described, positively acting means for preventing expansive wedging action between the two gate sections during movement of the gate assembly from either end of its travel to the other.

It is another object of this invention to provide positive means for centering the two gate sections of a double-wedged type gate assembly during initial movement thereof from sealed open or sealed closed position of the valve, for thereafter maintaining the two gate sections in centered relative position during movement of the gate assembly to the other end of its travel, and for permitting wedging relative displacement between the two gate sections to thereby expand the gate assembly and seal the valve when the gate assembly reaches the other end of its travel.

It is another object of this invention to provide means for accomplishing the foregoing objects without the use of springs.

It is a further object of this invention to provide means for accomplishing the foregoing objects for a double-wedge type gate assembly that is not under mechanical stress when the valve is in sealed open or sealed closed position.

Other objects and advantages of the invention will be apparent from the following specification and accompanying drawings in which:

Figure 2 is a view corresponding to Figure 1, showing the valve in closed sealed position.

Figure 3 is a view corresponding to Figure 1, showing the gate assembly between open and closed positions of the valve.

Figure 4 is an "exploded" perspective view of the two gate sections and the valve seats.

Figure 5 is a perspective view of a bell crank lever which connects the two gate sections.

Figure 6 is a fragmentary rear elevational view of the end of the longer arm of the bell crank lever shown in Figure 5.

Figure 7 is a fragmentary view corresponding to Figure 3 showing the application of this invention to a gate valve of the non-rising-stem type.

Figure 8 is a perspective view of one of the gate sections shown in Figure 7.

Figure 9 is a fragmentary, "exploded" perspective view of the bell crank lever shown in Figure 8.

Figure 10 is a fragmentary transverse vertical sectional view through a non-rising-stem gate valve, having a single-wedging expansible gate assembly embodying this invention. The valve is shown in open position with the valve gate assembly expanded into sealing engagement with the valve seats.

Figure 11 is a view corresponding to Figure 10, showing the valve in closed sealed position.

Figure 12 is a view corresponding to Figure 10, showing the valve gate assembly between open and closed positions of the valve.

Figure 13 is a side elevational view of a valve gate assembly corresponding to Figure 3, showing a modified construction of the lever which connects the two gate sections.

Figure 1:
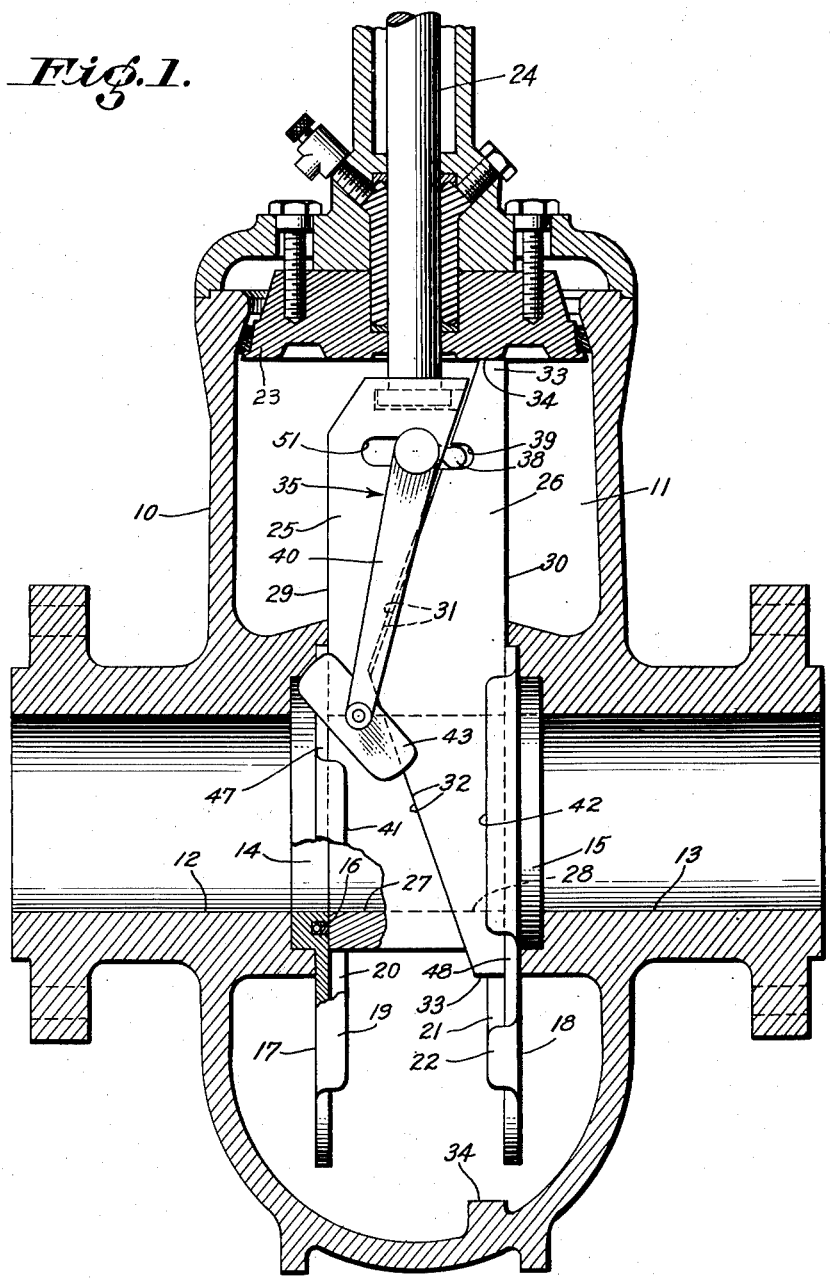
Figure 1 is a transverse vertical sectional view through a rising-stem gate valve having a double-wedging expansible gate assembly embodying this invention. The valve is shown in open position with the valve gate assembly expanded into sealing engagement with the valve seats.

Referring now to the drawings, there is shown in Figure 1 a through conduit gate valve, of the rising-stem type, having a housing 10 providing an interior valve chamber 11 in which is housed the gate mechanism of the valve. Aligned ports 12, 13, in opposite walls of the housing 10, are provided with parallel, preferably removable, flat-faced valve seats 14, 15. These seats are mounted in recesses at the inner ends of the ports and having spring-pressed wiper or packing rings 16. The area of the valve seats is extended by means of integral seat plates 17, 18, each provided with a pair of side flanges 19, 20 and 21, 22, respectively. The seats, plates, and side flanges serve to confine and guide the valve gate assembly for substantially rectilinear movement in opening and closing the valve, as later described. Although the seat plates 17, 18 are shown as being integral with the valve seats, they may be separate elements, as shown, for example, in the aforementioned Patent No. 2,479,124. The upper portion of the housing is of known construction having a bonnet 23 through which extends the valve stem 24. The stem is threadedly connected to a conventional hand wheel (not shown) rotation of which produces axial movement of the stem.

The ported valve gate assembly, which slides rectilinearly between the seats 14, 15, is formed in two sections, one hereinafter termed the gate 25 and the other the segment 26. Both sections have ports 27, 28 which in the open position of the valve, as shown in Figure 1, are aligned with the housing ports 12, 13 to provide a uniform, smooth-walled, unbroken passageway for unobstructed flow of fluid through the valve. The lower or inner end of the valve stem 24 is detachably connected to the upper, or adjacent, end of the gate 25, preferably by a T-head and slot connection. Hence, axial movement of the stem raises or lowers the gate assembly to open or close the valve.

The gate and the segment have flat outer faces 29, 30 disposed parallel to their respective flat-faced valve seats for sealing engagement therewith. It is obvious, however, that the sealing faces of the two sections of the gate assembly and their corresponding valve seats may be complementary arcuate or other suitable shape, in horizontal section, i. e. perpendicular to the valve stem, so long as such surfaces extend parallel to the movement of the gate assembly.

The inner opposed faces of the gate and the segment are formed with two complementary, angularly-related surface portions that diverge from the midportions of the gate and the segment to provide two sets of wedging surfaces 31, 32. When both sets of these wedging surfaces are in contact, as shown in Figure 3, the overall transverse dimension of the gate assembly, i. e. normal to the valve seats, is slightly less than the distance between the valve seats. Hence, the two assembly sections can be displaced to a limited extent, relative to each other, in directions parallel to the movement of the gate assembly. At both extremes of such displacement the gate assembly is expanded, by the action of one of the sets of wedging surfaces 31, 32, and the outer faces of the gate and the segment are forced into tight sealing engagement with their respective valve seats. Relative displacement is imparted to the gate and segment adjacent both ends of travel of the gate assembly by projections 33 on each end of the segment which, upon contact with corresponding fixed abutments 34 within the valve chamber 11, stop further movement of the segment (as shown in Figures 1 and 2) while the gate continues to be moved by the valve stem. Hence, the gate assembly is forcibly expanded and the valve sealed in the open position by the wedging surfaces 32, and in the closed position by the wedging surfaces 31. It is to be noted that when the valve is in sealed open position the tight engagement of the wedging surfaces 32 prevents leakage of fluid therebetween from the passageway through the gate assembly formed by the ports 27, 28.

In moving the assembly from either sealed open or sealed closed position to the other end of its travel, initial movement of the valve stem 24 imparts movement only to the gate 25, while the segment 26 remains stationary. This initial relative displacement between the two assembly sections immediately relieves the expansive forces imparted to the assembly by that set of wedging surfaces which sealed the valve in the position (either open or closed) out of which the assembly is being moved. Hence, the gate assembly is freed for movement toward the other end of its travel. In a valve of this type, however, forces frequently exist which retard movement of the segment 26. Thus, the segment may stick to its valve seat 15 because of a long period of disuse, or, if a large positive pressure differential exists between the valve chamber, or the gate side of the line, and the segment side of the line, the segment is pressed tightly against its seat. Such differential may occur either when the valve is closed and the pressure in the valve chamber is greater than that in the segment side of the line, or when the valve is being closed or opened against pressure on the gate side of the line, i. e. the gate side of the line is the upstream side. Hence means must be provided to prevent additional relative displacement, between the gate and the segment, sufficient to cause the other set of wedging surfaces to forcibly expand the assembly before the latter reaches the end of its travel.

This means, as herein disclosed, is provided by a bell crank lever 35, shown best in Figure 5, having a fulcrum pin 36 journalled in a bore which extends laterally through the gate 25, adjacent the upper, or stem, end thereof. The inner surface of the gate has a recess 37 (see Figure 4) extending into the bore. Secured to the central portion of the pin 36 and projecting out of the recess 37 is a short crank arm 38, substantially as wide as the recess and having an enlarged rounded outer end. This outer end of the crank arm 38 is somewhat bulbous in cross-section, i. e. its rounded surface defines an arc somewhat greater than 180°, and extends into a laterally extending slot or groove 39 (Figure 4) in the opposed inner face of the segment 26. The side faces or walls of the slot 39 are flat, parallel, and preferably disposed substantially normal to the movement of the gate assembly. The width of the slot 39 is equal to, or slightly greater than, the diameter, or thickness, of the rounded end of the short crank arm 38. Thus, the arm 38 is pivotally and slideably engaged with the segment 26, so that oscillation of the bell crank 35 effects relative displacement between the gate and the segment only in directions parallel to the movement of the assembly and, vice versa, i. e. such relative displacement cannot occur without pivotal movement of the bell crank lever. The other, and longer, crank arm 40 is mounted on the end of the fulcrum pin 36 and lies flat against the side of the gate assembly (Figure 1).

When the gate and the segment are in centered, or unwedged, relative position the longer crank arm 40 extends substantially parallel to the movement of the assembly, as shown in Figure 3. Hence, if the longer arm 40 is maintained in this position during movement of the gate assembly from one end of its travel to the other, the gate and the segment will be maintained in centered relative position during such movement, with the consequent impossibility of effecting expansion of the gate assembly by a wedging action on the part of either set of the wedging surfaces 31, 32. The means for maintaining the longer crank arm 40 in position to relatively center the gate and the segment during movement of the assembly consists of a generally elongated guiding shoe 43 mounted at its midportion for limited pivotal movement on the end of the arm 40, and sliding in a guideway having parallel sides or guide rails 41, 42 formed by the opposed edges of the seat plate side flanges 19 and 22, respectively. The shoe 43 has two straight sides 44, 45 (see Figures 5 and 6)

which merge into arcuate ends 46 having a common center of curvature at the pivot point of the shoe. The length of the shoe, through its pivot point, is substantially equal to the width of the guideway. Hence, when the gate assembly is moving from one end of its travel to the other, the opposite arcuate ends 46 of the shoe are substantially in slideable contact with the guide rails 41, 42, thus preventing pivotal movement of the bell crank lever 35 out of its "centering" position. The flanges 19, 22 forming the guide rails 41, 42 are alternately relieved or cut away at their opposite ends as indicated generally at 47, 48 (Figure 4), so that when the segment 26 is stopped by contact with a fixed abutment 34, the bell crank is free to pivot to permit wedging relative displacement between the two sections of the assembly, by continued movement of the gate. Hence, the bell crank lever 35 is under no stress when the valve is in sealed open or sealed closed position. Stops 49, 50 on the longer crank arm 40 (see Figure 6) limit the pivotal movement of the shoe 43 from a position at right angles to the arm 40 (Figures 3, 5, and 6) to a position of about 40° with respect thereto (Figures 1 and 2).

When there is frictional drag between the segment and its seat, i. e. movement-retarding forces acting on the segment, upon initial movement of the valve stem to move the assembly out of sealed-open or sealed-closed position, the turning moment exerted on the bell crank lever 35, by the shorter segment-engaged arm 38, immediately pivots the longer crank arm 40 from its "expanded" or "wedged" position (Figures 1 and 2) toward its "centered" or "unwedged" position (Figure 3). The crank arm 40 is thereupon stopped in this "centered" position by engagement of an end 46 of the shoe 43 with the guide rail opposite the relief 47 or 48 out of which the shoe has been moved. Hence, further displacement of the gate past centered position, relative to the segment, is impossible, and upon continued movement of the gate, by the valve stem, the crank arm 38 moves the segment along therewith. During movement of the assembly from open to closed position the shoe 43 slides against the guide rail 42 and from closed to open position against the guide rail 41. The frictional engagement between the ends 46 of the shoe and one or the other of these guide rails 41, 42, usually is effective to maintain the shoe in, or turn the shoe into, the position at right angles to the arm 40.

If there is only slight, or no, frictional drag between the segment and its seat, and/or the then effective wedging surfaces stick together, upon initial movement of the valve stem to move the assembly out of sealed-open or sealed-closed position, the turning moment exerted on the bell crank lever 35, by the shorter arm 38, may not be sufficient to pivot the longer crank arm 40 completely back to its "centered" position. Thereafter continued movement of the valve stem moves both the segment and the gate, as a unit, toward the other end of their travel. Since, in this instance, the crank arm 40 is out of its "centered" position, such movement of the assembly causes the side edge, 44 or 45, of the shoe to engage the end of a guide rail at the corner formed by the relief 48 or 47, respectively. This engagement pivots the shoe into its acute angular position with respect to the arm 40 so that continued movement of the assembly positively cams the crank arm 40 into its "centered" position without the possibility of the shoe becoming so engaged on the end of a guide rail that further movement of the assembly is impossible.

It is pointed out here that the ratio between the lengths of the crank arms 40 and 38 is relatively large. Hence, considerable leverage can be exerted by the crank arm 40 both to forcibly "center" the gate and the segment and to maintain these parts in centered, or unwedged, relative position. Furthermore, if the valve is to be used under high pressure service conditions, it may be desirable to increase the "centering" forces imparted by the bell crank by providing both ends of the fulcrum pin with long crank arms and guiding shoes, and forming both opposed pairs of the seat plate side flanges as guideways therefor. As previously stated, the preferred angular disposition of the side walls of the groove is at right angles to the movement of the assembly. Since it is desirable, however, to maintain the largest possible ratio between the lengths of the long crank arm 40 and the short crank arm 38, in smaller size valves the side walls of the groove 39 may be perpendicular to the inner wedging surfaces 31 (as shown in Figure 7) to thus permit the use of a somewhat shorter crank arm 38.

In order to permit assembly of the bell crank lever 35 with the gate 25, the bore in the gate is provided with a radial slot 51 (see Figure 4), extending toward the outer face 29 of the gate and of a size to accommodate the short crank arm 38. To assemble the parts the crank arm 40 is disposed 180° from the position shown in Figure 3, so that the short crank arm 38 is aligned with the slot 51. The fulcrum pin 36 of the crank may then be inserted for its full length into the bore with the arm 38 disposed in the slot 51. The crank arm 40 is then rotated counter clockwise 180° (to the position shown in Figure 3) to project the short crank arm 38 out of the recess 37. It is to be noted that the side walls 52 of the recess 37 then prevent withdrawal of the bell crank out of the bore so that the crank is locked in place and cannot drop off the gate assembly into the bottom of the valve chamber. This recess 37 is shown in the drawings as larger than actually necessary. Such enlargement is desirable in some larger size valves, however, in order to reduce the weight of the gate.

Because of the connection between the short crank arm 38 and the segment 26, the gate and the segment are substantially free for transverse relative displacement, i. e. normal to the valve seats. Because of this fact, if the valve is to be used under service conditions which may create a pressure lock situation, it is desirable to employ a spring in the assembly that exerts only transverse forces (i. e. normal to the valve seats) on the gate and the segment to resist relative transverse separation therebetween from a fully contracted position, i. e. with both sets of wedging surfaces 31, 32 in contact. A pressure lock situation can develop when the valve is closed and the pressure in the valve chamber is greater than that on both sides of the line. Unless preventive means are employed, upon the initial valve opening movement of the assembly such pressure differential immediately parts the wedging surfaces 31 and presses both the gate and the segment tightly against their respective valve seats, thus doubling the frictional forces normally necessary to be overcome in opening the valve. A spring connection between the gate and the segment, however, such as that shown at "35" in the aforesaid Patent No. 2,479,124, usually prevents the occurrence of a pressure lock in this type valve. This spring maintains the wedging surfaces 31 in sliding contact during the initial movement of the gate to open the valve, thus contracting the assembly, i. e. reducing its transverse dimension. Such contraction immediately unseals one or the other of the ports 12, 13 thereby neutralizing the pressure differential.

Although this invention has thus far been illustrated and described as applied to a valve of the rising-stem type, the invention is adapted for use in a non-rising-stem type of gate valve as shown in Figures 7, 8, and 9. In this valve the valve stem 24 is threadedly connected to the gate 25 so that rotation of the stem by a handwheel (not shown but illustrated in detail in the aforementioned Patent No. 2,482,409 to Fowler) imparts movement to the valve gate assembly to open and close the valve. Opposed recesses in the wedging surfaces 31 of both the gate and the segment provide a chamber 53 to accommodate the lower end of the valve stem when the assembly is in valve open position. The fulcrum pin 36 of the bell crank 35 extends inwardly of the gate and terminates flush with a side wall of the chamber 53. The crank is retained in the gate by a headed pin 54 (Figure 9) which is inserted in the inner end of an axial bore through the fulcrum pin 36. The outer end of the pin 54 is upset, welded, or otherwise fastened, to secure the pin to the crank. It is obvious, however, that other crank retaining means, such as a bolt, screw, etc. can be used for this purpose. The bore in which the fulcrum pin 36 is journalled is slotted longitudinally for reception of the crank arm 38. Obviously another bell crank can be employed on the opposite side of the gate in order to double the "centering" forces exerted on the two gate assembly sections The basic principles of the invention can also be applied to advantage in a valve gate assembly of the single-wedge type, as illustrated in Figures 10, 11, and 12. This gate assembly also has two sections, one stem-connected and one floating, which, for convenience, will also be termed the gate 55 and the segment 56, respectively. The inner opposed faces of the gate 55 and the segment 56, however, are formed with one set (instead of two sets) of parallel surfaces that are inclined with respect to the valve seats to form a single set of wedging surfaces 57. This set of wedging surfaces is effective to expand the gate assembly to seal the valve upon relative displacement between the gate and the segment in only one direction parallel to the movement of the assembly. A stop 58 is provided for the segment 56 as the assembly moves into closed position, as illustrated in Figure 11, so that continued closing movement of the gate 55 effects wedging relative displacement between the two sections to seal the valve. For the same reasons heretofore described with regard to a double-wedge valve gate assembly, means must be provided for preventing wedging relative displacement between the gate 55 and the segment 56 during movement of the assembly from open to closed position. (Obviously, no tendency for such wedging relative displacement exists during movement of the assembly from closed to open positions.) Furthermore, because expansion of the assembly can be effected by relative displacement of its two sections in only one direction, means other than a stop for the segment 56 must be provided for causing wedging relative displacement between the two sections to seal the valve as the assembly moves into open position.

The basic principles of this invention can be employed for accomplishing both of these purposes. A bell crank 35 is pivotally mounted on the gate 55 and has a short arm 38 engaged in a slot 39 in the segment 56, the same as in a double-wedge valve gate assembly. The crank also has a long arm 40 having a guiding shoe 43 pivotally mounted on the end thereof. Guide rails 41, 42 engaging opposite ends of the shoe maintain the crank 35 in angular position corresponding to the unwedged relative position of the two sections (Figure 12) of the assembly during movement thereof from either end of its travel. The lower end of the guide rails 42 is also suitably relieved, as at 48, to free the crank for pivotal movement upon wedging relative displacement between the gate and the segment as the assembly moves into closed position.

The other end of the guide rail 41, however, instead of being relieved, as in a double-wedge assembly, is provided with an inclined surface 59 that cams the crank into "wedging" angular position as the assembly moves into valve open position. Hence, the assembly is expanded into sealing engagement with the seats 14, 15 in both open and closed position of the valve. Since initial movement of the gate 55 to move the assembly out of open position tends to wedge the two sections more tightly in open position, the upper end of guide rail 42 is also provided with an inclined camming surface 60, parallel to the surface 59 and substantially engaged by the shoe 43 when the valve is open. This surface 60 cams the crank back into "unwedging" angular position as the assembly moves out of open position, thus immediately relieving the expansive forces to free the assembly for movement to closed position. As in a double-wedge assembly, the shoe 43 can be pivoted into an acute angular position with respect to the arm 40 to prevent the shoe from becoming so engaged with the lower end of the guide rail 42 that movement of the assembly is impossible. It is to be noted that in this modification the crank arms 38 and 40 are under no stress when the valve is closed, but are under stress when the valve is open.

Space for attachment of the bell crank lever to the valve gate assembly is at a premium in certain sizes, especially the smaller sizes, of gate valves of the type described herein. A simplified space-saving construction of a lever and means for connecting the same to the two sections of a double-wedge valve gate assembly is shown in Figure 13. In this construction a long, generally triangular lever 61 has substantially aligned slots or notches 62 in opposite edges of the wider end thereof and the narrower end is provided with a pivotally connected guiding shoe 43 as in the previously described constructions. Opposite sides of the slots 62 are parallel and extend substantially normal to the movement of the assembly. The lever 61 is connected to the assembly by headed pins 63 which extend snugly through the slots 62, closely adjacent the inner ends of the latter, and are inserted, with a pressed fit, into corresponding bores in the gate 25 and the segment 26, respectively. Obviously rotational movement of the lever 61 from the "centering" position shown, about either of the pins 63 as a fulcrum point, will effect wedging displacement between the gate and the segment.

Technically speaking, the lever 61 is not a true bell crank because it is connected to both pins 63 for sliding as well as pivotal movement thereon. The practical effect of the operation of the lever 61, however, is the same as that of a bell crank lever. It also will be noted that, although the lever is slideably connected to each pin 63, when the assembly is installed in a valve the lever cannot drop off the assembly.

Although specific embodiments of the invention have been shown and described, it will be realized that these embodiments are purely illustrative of the invention and that numerous variations, which retain the principles of the invention, will be apparent to one skilled in the art. Therefore, the invention encompasses all changes and modifications which come within the spirit and scope of the following claims.

I claim:

1. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve-closed positions; stop means for one of said members for effecting wedging relative displacement therebetween adjacent at least one end of travel of said assembly in order to seal the valve; and means positively preventing wedging relative displacement between said members until said assembly is positioned substantially at one end of its travel, said last mentioned means including a lever fulcrumed on one of said members and having sliding pivotal connection with the other of said members and means within said chamber engageable by a portion of said lever for controlling the pivotal movement thereof.

2. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner wedging faces effective to expand said assembly normally of said seats and force said members oppositely into sealing engagement therewith upon relative displacement between said members in at least one direction parallel to the movement of said assembly; means for moving said assembly to valve-open and valve-closed positions; stop means for one of said members for effecting assembly-expansive wedging action therebetween adjacent at least one end of travel of said assembly in order to seal the valve; a lever fulcrumed on one of said members and having sliding pivotal connection with the other of said members for effecting relative displacement therebetween by pivotal movement of said lever; a guiding shoe mounted on said lever; and opposed fixed guide rails within said chamber extending parallel to the movement of said assembly and slideably engageable with opposite ends of said shoe for maintaining said lever in angular position corresponding to the unwedged relative positions of said members during movement of said assembly from the other end of its travel to said one end, one of said guide rails terminating adjacent the one end of travel of said shoe to permit pivotal movement of said lever upon assembly-expansive wedging action between said members to seal the valve at said one end of travel of said assembly.

3. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner wedging faces effective to expand said assembly normally of said seats and force said members oppositely into sealing engagement therewith upon relative displacement between said members in at least one direction parallel to the movement of said assembly; means for moving said assembly to valve-open and valve-closed positions and for effecting assembly-expansive wedging relative displacement between said members adjacent at least one end of travel of said assembly in order to seal the valve; and means positively preventing wedging relative displacement between said members until said assembly is positioned substantially at one end of its travel, said last mentioned means including a lever fulcrumed on one of said members and having sliding pivotal connection with the other of said members and means within said chamber engageable by a portion of said lever for controlling the pivotal movement thereof.

4. The structure defined in claim 3 including valve seat plates having side flanges to confine and guide the assembly during movement thereof, the edges of one set of opposed said flanges forming the last mentioned means.

5. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner wedging faces effective to expand said assembly normally of said seats and force said members oppositely into sealing engagement therewith upon relative displacement between said members in at least one direction parallel to the movement of said assembly; means for moving said assembly to valve-open and valve-closed positions and for effecting assembly-expansive wedging action between said members adjacent at least one end of travel of said assembly in order to seal the valve; a bell crank lever mounted on one of said members for pivotal movement about an axis parallel to said valve seats and normal to the movement of said assembly, one arm of said crank having sliding pivotal connection with the other of said members for positively effecting relative displacement therebetween by pivotal movement of said crank; and a fixed guide within said chamber slideably engageable by the other arm of said crank for maintaining said crank in angular position corresponding to the unwedged relative position of said members, said guide being of such limited lengthwise extent as will allow pivotal movement of said lever when said assembly is positioned substantially at said one or the other end of its travel.

6. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve-closed positions; stop means for one of said members for effecting wedging relative displacement therebetween adjacent at least one end of travel of said assembly in order to seal the valve; a bell crank lever mounted on one of said members for pivotal movement about an axis parallel to said valve seats and normal to the movement of said assembly; means defining opposed flat surfaces on the other of said members extending parallel to said crank axis and lying substantially at an angle of between 90° with respect to the outer face of said other member and 90° with respect to said inclined inner surface portion thereof, one arm of said crank having an enlarged rounded end slideably engaged by said surfaces for positively effecting relative displacement between said members by pivotal movement of said crank; and fixed guideway means within said chamber slideably engageable by the other arm of said crank for maintaining said crank in angular position corresponding to the unwedged relative position of said members, said fixed guideway means being of such limited lengthwise extent as will allow pivotal movement of said lever when said assembly is positioned substantially at said one or the other end of its travel.

7. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner wedging faces effective to expand said assembly normally of said seats and force said members oppositely into sealing engagement therewith upon relative displacement between said members in at least one direction parallel to the movement of said assembly; means for moving said assembly to valve-open and valve-closed positions and for effecting assembly-expansive wedging action between said members adjacent at least one end of travel of said assembly in order to seal the valve; a bell crank lever having a fulcrum pin journalled in one of said members about an axis parallel to said valve seats and normal to the movement of said assembly; means defining a recess in the inner face of said one member extending inwardly to said pin, one arm of said lever being secured to said pin and projecting out of said recess into sliding pivotal engagement with the other of said members for positively effecting relative displacement therebetween by pivotal movement of said crank; and fixed guideway means within said chamber slideably engageable by the other arm of said crank for maintaining said crank in angular position corresponding to the unwedged relative position of said members, said fixed guideway means being of such limited lengthwise extent as will allow pivotal movement of said lever at said one or the other end of its travel.

8. The structure defined in claim 7 in which the recess is provided with side walls disposed substantially normal to the axis of said pin and closely adjacent opposite sides of the said one crank arm.

9. The structure defined in claim 7 including means defining a chamber between the members to receive the lower end of a nonrising valve stem, the fulcrum pin extending from the exterior of the said one member into said chamber and having pin retaining means secured to the inner end thereof to prevent withdrawal of said pin.

10. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner faces each formed with two angularly related surface portions that diverge transversely of said members, from the central portions thereof, to form two sets of wedging surfaces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions; stop means for one of said members for effecting wedging relative displacement therebetween adjacent both ends of travel of said assembly in order to seal the valve; and means, including a lever operatively connecting said members for relative displacement therebetween by pivotal movement of said lever and fixed guideway means within said chamber for controlling the pivotal movement of said lever, and for positively maintaining said members in centered relative position, said fixed guideway means being of such limited lengthwise extent as will allow pivotal movement of said lever when said assembly is positioned substantially at either of its ends of travel.

11. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner wedging faces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions and for effecting assembly-expansive wedging action between said members adjacent both ends of travel of said assembly in order to seal the valve; and means, including a lever operatively connecting said members for relative displacement therebetween by pivotal movement of said lever and fixed guideway means within said chamber for controlling the pivotal movement of said lever, for positively effecting centering relative displacement between said members upon the initiation of movement of said assembly from either end of its travel toward the other, and for thereafter positively maintaining said members in centered relative position substantially throughout movement of said assembly to the other end of its travel.

12. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner faces each formed with two angularly related surface portions that diverge transversely of said members, from the central portions thereof, to form two sets of wedging surfaces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions; means for effecting assembly-expansive wedging action between said members adjacent both ends of travel of said assembly in order to seal the valve; and means positively preventing wedging relative displacement between said members until said assembly is positioned substantially at one end of its travel, said last mentioned means including a lever fulcrumed on one of said members and having sliding pivotal connection with the other of said members and means within said chamber engageable by a portion of said lever for controlling the pivotal movement thereof.

13. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner faces each formed with two angularly related surface portions that diverge transversely of said members, from the central portions thereof, to form two sets of wedging surfaces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions and for effecting wedging relative displacement between said members adjacent both ends of travel of said assembly in order to seal the valve; and means for positively maintaining said members in centered relative position, said last-mentioned means including a bell crank lever pivotally mounted on one of said members, one arm of said lever having sliding pivotal engagement with the other of said members, and fixed guideway means within said chamber slideably engageable by the other arm of said lever for preventing pivotal movement thereof relative to said one member, said guideway means being of such limited lengthwise extent as will allow pivotal movement of said lever when said assembly is positioned substantially at either of its ends of travel.

14. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner faces each formed with two angularly related surface portions that diverge transversely of said members, from the central portions thereof, to form two sets of wedging surfaces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions; stop means for one of said members for effecting wedging relative displacement therebetween adjacent both ends of travel of said assembly in order to seal the valve; a bell crank lever mounted on one of said members for pivotal movement about an axis parallel to said valve seats and normal to the movement of said assembly, one arm of said lever being pivotally engaged with the other of said members for sliding movement, relative thereto, substantially normally of said valve seats for effecting relative displacement between said members by pivotal movement of said lever; and a fixed guideway within said chamber slideably engageable by the other arm of said lever for maintaining said lever in angular position to center said members, said guideway being of such limited lengthwise extent as will allow pivotal movement of said lever when said assembly is positioned substantially at either of its ends of travel.

15. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner faces each formed with two angularly related surface portions that diverge transversely of said members, from the central portions thereof, to form two sets of wedging surfaces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions and for effecting wedging relative displacement between said members adjacent both ends of travel of said assembly in order to seal the valve; a bell crank lever mounted on one of said members for pivotal movement about an axis parallel to said valve seats and normal to the movement of said assembly; means defining opposed flat surfaces on the other of said members extending parallel to said axis and substantially normally of said valve seats, one arm of said lever having an enlarged rounded end slideably engaged by said surfaces for effecting relative displacement between said members by pivotal movement of said lever; and fixed guideway means within said chamber slideably engageable by the other arm of said lever for maintaining said lever in angular position to center said members, said guideway means being of such limited lengthwise extent as will allow pivotal movement of said lever when said assembly is positioned substantially at either of its ends of travel.

16. A gate valve comprising: a housing forming a valve chamber having aligned ports provided with opposed parallel valve seats; an expansible valve gate assembly mounted for rectilinear movement between said seats to open and close the valve, said assembly comprising two ported abutting members having parallel outer sealing faces to engage the valve seats and complementary opposed inner faces each formed with two angularly related surface portions that diverge transversely of said members, from the central portions thereof, to form two sets of wedging surfaces effective to expand said assembly normally of said seats and force said members oppositely into sealing engagement therewith upon relative displacement between said members, in either direction parallel to the movement of said assembly, from a centered relative position wherein the apexes of said inner faces are aligned; means for moving said assembly to valve-open and valve-closed positions; stop means for one of said members for effecting wedging relative displacement therebetween adjacent both ends of travel of said assembly in order to seal the valve; a lever fulcrumed on one of said members and having sliding pivotal connection with the other of said members for effecting relative displacement therebetween by pivotal movement of said lever; a guiding shoe mounted on said lever; and opposed fixed guide rails within said chamber extending parallel to the movement of said assembly and slideably engageable with opposite ends of said shoe for maintaining said lever in angular position to center said members during movement of said assembly from either end of its travel to the other, alternate opposite ends of said guide rails terminating adjacent the ends of travel of said shoe to permit pivotal movement of said lever upon wedging relative displacement between said members to seal the valve at the ends of travel of said assembly.

17. The structure defined in claim 16 in which the shoe is mounted for pivotal movement on the lever and has substantially parallel straight side portions that terminate in arcuate guide-rail-engaging ends having a common radius of curvature at the pivot point of said shoe, and including stop means for limiting the pivotal movement of said shoe from a position wherein the angle between said straight sides and said guide rails is substantially a right angle to a position wherein said angle is acute, whereby, upon the initiation of movement of the assembly from either end of its travel toward the other, engagement between a straight side of said shoe and the end of a guide rail turns said shoe into said acute angular position for camming said lever into its member-centering angular position.

18. A gate valve comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer faces to engage the valve seats and complementary opposed inner faces each formed with a surface that is inclined with respect to said seats to form one set of wedging surfaces effective to expand said assembly normally of said seats and force said members into sealing engagement therewith upon relative displacement between said members in one direction parallel to the movement of said assembly; means for moving said assembly to valve-open and valve-closed positions; stop means for one of said members for effecting wedging relative displacement therebetween adjacent one end of travel of said assembly in order to seal the valve; and means for effecting wedging relative displacement between said members adjacent the other end of travel of said assembly in order to seal the valve, for positively effecting unwedging relative displacement between said members upon the initiation of movement of said assembly from either end of its travel toward the other, and for thereafter positively maintaining said members in unwedged relative position substantially throughout movement of said assembly to the other end of its travel, said last named means comprising a lever fulcrumed on one of said members and having sliding pivotal connection with the other of said members for effecting relative displacement therebetween by pivotal movement of lever and fixed guideway means within said housing slideably engageable by a portion of said lever for controlling the pivotal movement thereof.

19. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve-closed positions and for effecting wedging relative displacement between said members adjacent at least one end of travel of said assembly in order to seal the valve; a lever fulcrumed on one of said members and having a slot in an edge portion thereof; a pin extending through said slot and secured to the other of said members for effecting relative displacement therebetween by pivotal movement of said lever; and fixed guide means within said chamber slideably engageable by a portion of said lever for maintaining said lever in angular position corresponding to the unwedged relative position of said members, said guide means being of such limited lengthwise extent as will allow pivotal movement of said lever when said assembly is positioned substantially at said one or the other of its ends of travel.

20. A gate valve comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer faces to engage the valve seats and complementary opposed inner faces each formed with a surface that is inclined with respect to said seats to form one set of wedging surfaces effective to expand said assembly normally of said seats and force said members into sealing engagement therewith upon relative displacement between said members in one direction parallel to the movement of said assembly; means for moving said assembly to valve-open and valve-closed positions; stop means for one of said members for effecting wedging relative displacement therebetween adjacent one end of travel of said assembly in order to seal the valve; means, including a lever fulcrumed on one of said members and having sliding pivotal connection with the other of said members and a fixed cam surface within said chamber slideably engageable by a portion of said lever, for effecting wedging relative displacement between said members adjacent the other end of travel of said assembly in order to seal the valve; and a second fixed cam surface within the chamber slideably engageable by another portion of the lever for positively effecting unwedging relative displacement between the members upon the initiation of movement of the assembly from said other end of travel toward said one end.

MILTON P. LAURENT.

REFERENCES CITED

The following references are of record in the file of this patent:

UNITED STATES PATENTS

| Number | Name | Date |
| --- | --- | --- |
| 2,210,189 | Sorensen | Aug. 6, 1940 |
| 2,276,620 | Harrington | Mar. 17, 1942 |
| 2,479,124 | Laurent | Aug. 16, 1949 |
| 2,482,409 | Fowler | Aug. 20, 1949 |